No. 656,285. Patented Aug. 21, 1900.
G. H. GOEBEL.
SEALING WAX HOLDER.
(Application filed Apr. 27, 1900.)

(No Model.)

Attest:
Geo H Botts
Edith Sarles

Inventor:
George H. Goebel
By Edith J. Griswold
his attorney

THE NORRIS PETERS CO., PHOTO-LITHO., WASHINGTON, D. C.

UNITED STATES PATENT OFFICE.

GEORGE H. GOEBEL, OF NEWARK, NEW JERSEY, ASSIGNOR TO THE POMEROY BROTHERS COMPANY, OF HARRISON, NEW JERSEY.

SEALING-WAX HOLDER.

SPECIFICATION forming part of Letters Patent No. 656,285, dated August 21, 1900.

Application filed April 27, 1900. Serial No. 14,549. (No model.)

*To all whom it may concern:*

Be it known that I, GEORGE H. GOEBEL, a citizen of the United States, and a resident of Newark, New Jersey, have invented a Sealing-Wax Holder, of which the following is a specification.

This invention relates to the preparation for the market of sealing-wax or other adhesive substance that will melt by heat, and has for its object to avoid the many disadvantages in the manufacture, handling, and use of sealing-wax consequent on the present method of putting the article on the market.

Heretofore sealing-wax has been prepared for the market by first molding and then reheating, melting the surface to polish and give the necessary gloss, thus showing the true color, and then stamping with a die. The molds are expensive and the loss from defects in molding, polishing, and stamping is considerable. Moreover, the finished article as now on the market must be handled delicately from first to last, it must be carefully wrapped and packed for shipment owing to the fact that it is easily broken, heat and sunlight cause the articles to bend, twist, or melt, the polish is often destroyed from handling by customers, and in use the delicate colors are easily destroyed by smoke, charring, or burning.

By this invention the molding, reheating, polishing, and stamping are all done away with and the sealing-wax is presented in a new form adapted to obviate all the above-mentioned defects and to add new features quite impracticable with the old form of sticks of sealing-wax.

According to the present invention when the wax is in a fluid condition it is simply poured into a tube or other form of glass, metal, or other non-inflammable material and then allowed to cool and harden, in which tube the wax remains until completely used up. Thus the new article of commerce consists of a body of sealing-wax of any suitable shape provided with a cover or casing of any suitable material that will withstand heat necessary to melt the wax. Moreover, two or more colors of wax may be inclosed in one casing separated by cardboard, tin, or other suitable material and melted at one operation, as and for the purposes hereinafter mentioned.

Figure 1:
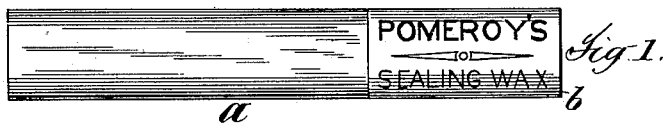
Figure 2:
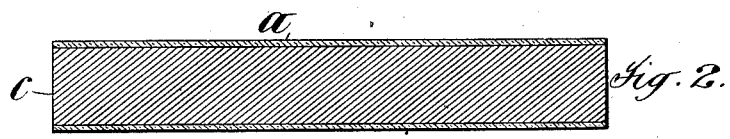
Figure 3:
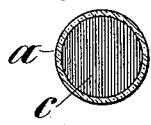
Figure 4:
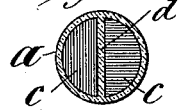
Figure 5:
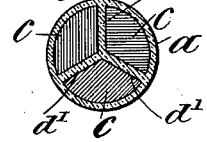

In the accompanying drawings, Figure 1 represents a side view of a tube of sealing-wax prepared according to my invention. Fig. 2 is a longitudinal section of Fig. 1. Fig. 3 is an end view of Fig. 1. Figs. 4 and 5 are end views of tubes partitioned into two and three compartments, respectively, to hold two or three colors of wax.

Fig. 1 represents a tube or casing $a$, of glass or other transparent material, in which a label $b$ has been inserted before filling with wax. Figs. 1, 2, and 3 show the tube as filled with only one color of wax. Fig. 4 shows the tube $a$ provided with a partition $d$, dividing it into two compartments to separately hold two colors of wax in one casing, and Fig. 5 shows the tube $a$ adapted to hold three colors of wax $c$, separated by the partitions $d'$ in such a manner that when melted two or three colors may be dropped from one end of the tube at once.

When the wax is to be used, the tube is held above the flame of a candle, gas-jet, &c., at an angle to prevent the wax from running out of the tube while being melted, and when sufficiently heated the wax may be dropped from an open end of the tube exactly over the proper place to be sealed and in the exact quantity desired. With the wax thus inclosed, so that the flame does not come in contact with it, there is no charring or burning of the wax, whereby its color may be kept perfectly pure, a great advantage for the delicate and most desirable colors; also a better impression with a seal can be made, for while the first drops may be cooled by coming in contact with the paper or other material to be sealed the top portion of the wax is hot, having been kept so by the heated tube. Then, too, there is no danger of dropping the wax in places where damage may be done, nor of losing any of the wax from burning or dropping or of burning the fingers. The provision for dropping two or more colors at once from a common outlet of the tube allows of the display of class-colors or the like, a feature impracticable with the common stick of sealing-wax.

The saving in the manufacture is very considerable over the old method, no careful wrapping is necessary, there is little danger of breaking of the tubes even when made of glass while the tubes are filled with wax, the wax is kept perfectly clean, and the former drawback of having the wax melt, twist, or get out of shape in hot weather or in hot climates is wholly avoided.

It is evident that a tube may contain two colors to be used separately by partitioning the tube crosswise instead of lengthwise—that is, one color may completely fill a portion of the length of the tube to be dropped from one end and another color fill the other portion of the tube to be dropped from the other end.

The tube or casing may be of any suitable non-inflammable material that will maintain its shape and hold the wax while it is being melted; but glass is preferable for many reasons. It is transparent, allowing the color of the wax to show, as well as protecting a label inside the tube. It gives a luster or glossy appearance to the unpolished wax, thus bringing out the true color, and, moreover, a glass tube may be highly heated at one end momentarily without conveying the heat to the hand holding the other end.

While the drawings represent the sealing-wax or the like inclosed in tubes only, it is quite evident that any other convenient or fancy form may be adopted without departing from the principle of my invention, which is the inclosing of sealing-wax or the like in a suitable casing for the purposes mentioned.

It is to be understood that the term "sealing-wax" in the claims is intended to cover all substances which are adhesive and melt by heat.

I claim as my invention—

1. A new article of commerce consisting of a glass tube containing a body of sealing-wax that has been poured into said tube while in a fluid condition and allowed to cool and harden therein.

2. A new article of commerce consisting of a non-inflammable tube or casing provided with two or more compartments all opening out of one end of said tube, the said compartments containing sealing-wax of different colors.

In testimony whereof I have signed my name to this specification in the presence of two subscribing witnesses.

GEORGE H. GOEBEL.

Witnesses:
EDITH SARLES,
EDITH J. GRISWOLD.